US008972318B2

(12) United States Patent
Prakash et al.

(10) Patent No.: US 8,972,318 B2
(45) Date of Patent: Mar. 3, 2015

(54) PREDICTING USER BEHAVIOR USING FEEDBACK ON PREVIOUSLY RUN PREDICTIVE SEARCHES

(75) Inventors: Yashwanth Prakash, San Diego, CA (US); Charles S. Wurster, San Diego, CA (US); Eric P. Bilange, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 13/484,432

(22) Filed: May 31, 2012

(65) Prior Publication Data

US 2013/0325780 A1 Dec. 5, 2013

(51) Int. Cl.
*G06F 17/00* (2006.01)
*G06N 5/02* (2006.01)
*G06F 17/30* (2006.01)

(52) U.S. Cl.
CPC ............ *G06N 5/02* (2013.01); *G06F 17/30867* (2013.01)
USPC ........................................................ 706/45

(58) Field of Classification Search
USPC .................................................... 706/12, 45
See application file for complete search history.

(56) References Cited

U.S. PATENT DOCUMENTS

| | | | | |
|---|---|---|---|---|
| 6,144,964 | A * | 11/2000 | Breese et al. | 707/758 |
| 7,774,003 | B1 * | 8/2010 | Ortega et al. | 455/456.2 |
| 8,055,282 | B1 | 11/2011 | Ortega et al. | |
| 2007/0061245 | A1 | 3/2007 | Ramer et al. | |
| 2008/0005071 | A1 | 1/2008 | Flake et al. | |
| 2009/0157617 | A1 | 6/2009 | Herlocker et al. | |
| 2009/0187515 | A1 * | 7/2009 | Andrew et al. | 706/12 |
| 2009/0193099 | A1 | 7/2009 | Partridge et al. | |
| 2010/0082434 | A1 | 4/2010 | Chen et al. | |
| 2010/0305848 | A1 | 12/2010 | Stallman | |
| 2010/0318535 | A1 | 12/2010 | Weber et al. | |
| 2012/0158289 | A1 | 6/2012 | Bernheim et al. | |

FOREIGN PATENT DOCUMENTS

WO 0125947 A1 4/2001

OTHER PUBLICATIONS

Breese et al., Empirical Analysis of Predictive ALgorithms for Collaborative Filtering, 1998, Kaufmann Publishers, pp. 43-52.*
Bellotti et al., Activity-Based Serendipitous Recommendations with the Magitti Mobile Leisure Guide, 2008, CHI 2008 Proceedings, pp. 1-10.*

(Continued)

*Primary Examiner* — David Vincent
(74) *Attorney, Agent, or Firm* — Gerald P. Joyce, III

(57) ABSTRACT

Systems, methods, and devices use search terms, current state information, historical data, and expected location hints to predict where a user may be when a search may be relevant. In an embodiment, search terms entered on a first user computing device may be combined with location information resident on a second user computing device to determine where a user is likely to be and what results are likely to be relevant to a user in the future. In a further embodiment, relevant search terms indicative of time, such as "tomorrow" or "tonight," and/or user-related information may also be used to return predictive search results. In a further embodiment, user-related information from other users may also be used to return predictive search results.

18 Claims, 14 Drawing Sheets

(56) References Cited

OTHER PUBLICATIONS

International Search Report and Written Opinion—PCT/US2013/043427—ISA/EPO—Aug. 2, 2013.
Teevan J., et al., "Understanding the importance of location, time, and people in mobile local search behavior", MobileHCI '11 Proceedings of the 13th International Conference on Human Computer Interaction with Mobile Devices and Services, Aug. 30, 2011, pp. 77-80, XP055072594, Stockholm DOI: 10.1145/2037373.2037386 ISBN: 978-1-45-030541-9 Retrieved from the Internet: URL: http://delivery.acm.org/10.1145/2040000/2037386/p77-teevan.pdf [retrieved on Jul. 23, 2013] p. 79, right-hand column, line 13, paragraph 3-line 16.

\* cited by examiner

US 8,972,318 B2

PREDICTING USER BEHAVIOR USING FEEDBACK ON PREVIOUSLY RUN PREDICTIVE SEARCHES

BACKGROUND

An Internet search engine may utilize a set of search terms and possibly a location input by the user to search for relevant results. As an example, the user may input the search term "restaurant" and the location "San Diego." The search engine may then search for results in San Diego. Rather than use location input from a user, search engines operating on a user's mobile device may take location information received from the user's mobile device and utilize the received location information to provide the user with relevant search results. As an example, the user of the mobile device may enter the search term "restaurant," and the search engine operating on the user's mobile device may also receive location information from the user's mobile device indicating the user is in San Diego. The search engine may then only return results for restaurants located in San Diego.

Whether utilizing user-entered search terms, or a combination of user-entered search terms and current location information, a drawback of current search engines is that they return results that are relevant to users at the time and location that the searches are run. Current search engines cannot account for a user's travel plans, user behavior patterns, the user's schedule or calendar, or time predictive search terms, such as "tonight" or "tomorrow." Thus, while current search engines can determine that the user is in the San Diego airport, the search engine cannot determine that the user is awaiting a flight to New York City and use that information to conduct a search relevant to New York City. Additionally, all devices a user may run a search are not necessarily mobile and/or configured to determine current location. The lack of a location determination capability in such devices may reduce the usefulness of searches.

SUMMARY

The systems, methods, and devices of the various embodiments use search terms, current state information, historical data related to the user's behavior, and expected location hints to predict where a user may be in order to conduct a search that will be relevant to the user at a future time. In an embodiment, search terms entered on a first user computing device may be combined with location information resident on a second user computing device to determine where a user is likely to be and results that are likely to be relevant to the user in the future. In a further embodiment, relevant search terms indicative of time, such as "tomorrow" or "tonight," and/or user-related information may also be used to return predictive search results. In a further embodiment, user-related information from other users may also be used to return predictive search results.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
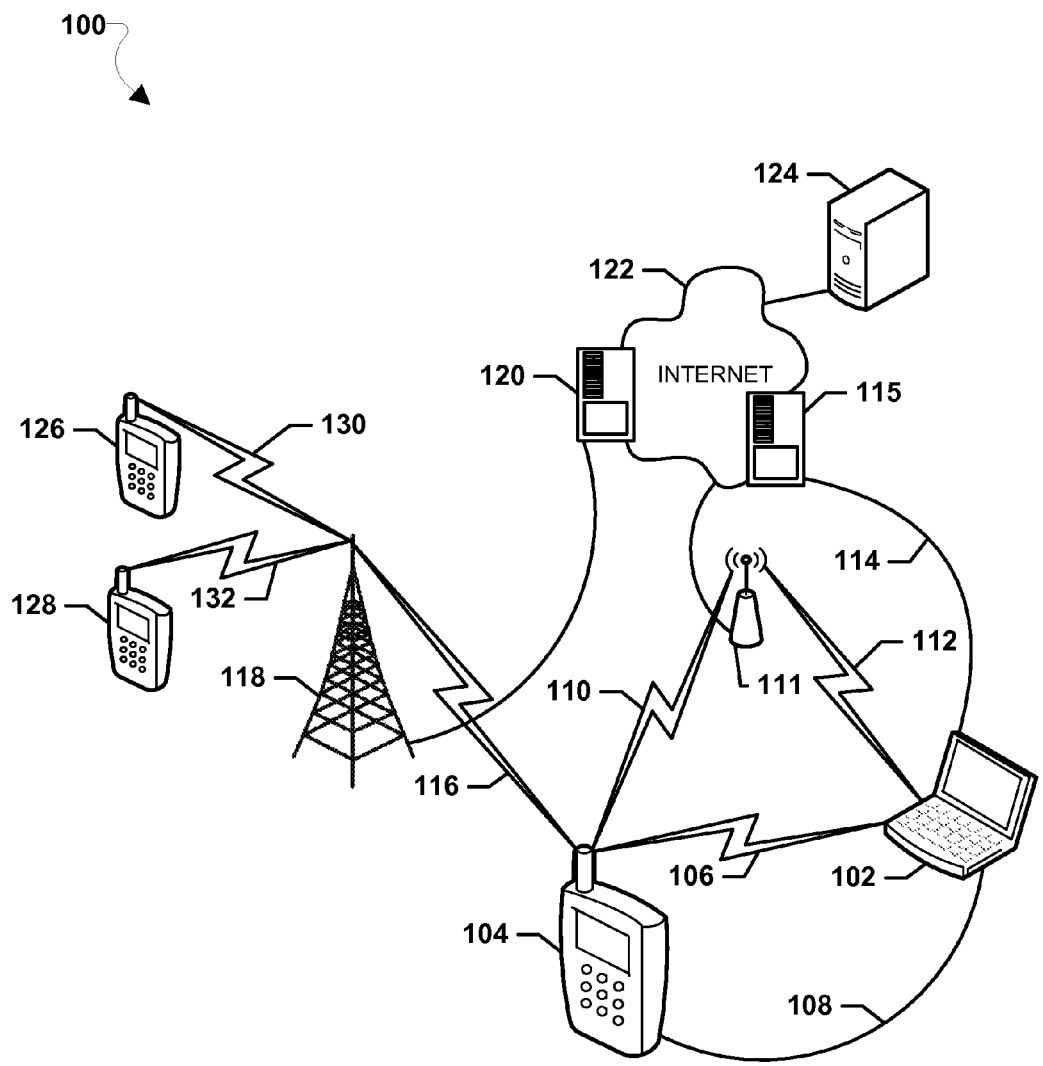
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "computing device," "wireless device," and "mobile device" refer to any one or all of cellular telephones, smart phones, personal or mobile multi-media players, personal data assistants (PDA's), laptop computers, tablet computers, desktop computers, smart books, palm-top computers, wireless electronic mail receivers, multimedia Internet enabled cellular telephones, wireless gaming controllers, and similar personal electronic devices which include a programmable processor and memory and circuitry for modifying search terms.

The systems, methods, and devices of the various embodiments use search terms, current state information, historical data, and expected location hints to predict where a user may be when a search may be relevant. In an embodiment, search terms entered on a first user computing device may be modified based on a prediction of the user's behavior made on a second user computing device.

In another embodiment, search terms entered on a first user computing device may be combined with location information resident on a second user computing device to determine where a user is likely to be and the types of search results that are likely to be relevant to the user in the future. In a further embodiment, user-entered search terms suggestive of a future time, such as "tomorrow" or "tonight," and/or user-related information may also be used to return predictive search results. In a further embodiment, user-related information from other users may also be used to return predictive search results. In another embodiment, user-related information from other devices may also be used to return predictive search results.

The various embodiments use the predictive abilities realized with access to user-related information to improve the results returned by search engines. In the various embodiments, search terms, current state information, historical data, and expected location hints may be used together to predict when a search will be relevant and the location the user may be at when the search will be relevant. Based on that determination of a relevant location and time, the search engine may return search results related to the predicted future location.

In an embodiment, search terms, current state information, historical data, and recent user behavior may be used to generate a predictive search relevant to the user's future activity and location. A user may enter search terms into a search engine user interface running on the user's computing device, such as a laptop computer. As an example, the user may enter the terms "restaurant tonight" as part of a search request. The search engine may process the inputted search terms to determine whether the search corresponds to a predictive search indication. In an embodiment, a predictive search indication may be the inclusion of a temporal term included within the search terms. Temporal terms may be terms entered by the user indicating a time regarding when the search will be relevant, such as "tonight" or "tomorrow." If the user's search terms include temporal terms, the search engine may modify/restrict the search based on the temporal terms. As an example, based on the search terms "restaurant tonight," the search engine may identify the temporal term "tonight."

In an embodiment, based on the identified temporal term, the search engine running on a first computing device may access another of the user's computing devices, such as the user's smart phone, to request a prediction of the user's future location. The other (i.e. second) computing device may receive the prediction request message and, using the user's calendar information stored on the second computing device (e.g., the user's smart phone), may generate a prediction of where the user will be that evening. As an example, the user's calendar information stored on the user's smart phone may indicate that the user is scheduled to be in New York City that evening, and thus the predicted location in such a situation would be "New York City." In an embodiment, the user's second computing device may provide the predicted location to the first computing device running the search engine and the search engine may modify or restrict the search based on the predicted location. For example, the search engine may modify or restrict the search to restaurants located in New York City.

In an embodiment, the user's second computing device may provide current state information associated with the user. Such current state information may include the date and time as determined by the second computing device, information about the current applications running on the second computing device, the second computing device's current location, the second computing device's current velocity (i.e., speed and direction of travel), information received from sensors on the second computing device, and/or information about the second computing device's current settings. In an embodiment, current state information may be used to modify/restrict the search.

In an embodiment, the user's second computing device may determine whether that device's current state information indicates a future change in state. As an example, in response to a prediction request, the second computing device may determine that the user's current location is in the parking lot of the user's office, and may determine that a turn by turn navigation application is currently running. The user's current state may be determined to be in the office parking lot en route to a new location. The second computing device may then determine whether the current state is indicating a future change in state. Based on the running turn by turn navigation application, the second computing device may determine a future change in state is likely, and based on information from the turn by turn navigation application may determine a likely future state. For example, the turn by turn navigation application may indicate that the user is following a route starting in the office parking lot in San Diego and terminating in New York City. In this example, the second computing device may determine that the user's future state will be in Colorado that night, and the second computing device may provide the current state, "San Diego," and future state, "Colorado," information to the search engine. In a further embodiment, based on the search terms "restaurant tonight" the search engine may then modify/restrict the search to restaurants in Colorado.

In an embodiment, the user's second computing device may determine any historical behavior related to the search terms, current state, and/or future state of the user. In an embodiment, the user's second computing device may have access to a user behavior database, which may be maintained on that device (e.g., a smart phone) or at a central server. As an example, a user behavior database may contain historical behavior information related to a user's travel patterns, activity patterns, past searches, and/or places or topics of interest. In an embodiment, the search terms may be provided to the user behavior database and compared to historical behaviors to determine how to restrict and/or focus the search. The user behavior database may then return additional focusing/modifying/restricting terms. As an example, if a user always goes to a sports bar on Monday nights, historical behavior information may be used by the search engine to modify/restrict the search to sports bars based on the terms "restaurant tonight" being entered on a Monday.

In an embodiment, the user's second computing device may determine any recent behavior related to the search terms, current state, and/or future state. The user's second computing device may have access to a user's calendar application, Twitter® account, Facebook® account or other recent searches run by the user. The user's second computing device may determine whether the user's recent behavior is related to the entered search terms, current state, and/or future state. If the recent behavior is related to the search terms, current state, and/or future state, the user's second computing device may return additional modifying/restricting terms based on the recent behavior. As an example, if a recent search was for a hotel in Colorado, the search based on the search terms "restaurant tonight" may be modified/restricted to restaurants near the previously searched hotel in Colorado.

In another embodiment, additional user information may be utilized by the user's second computing device to further tailor the search. As an example, demographics about the user may be used to tailor the generated search and/or the search results. User demographics may be used initially when historical user behavior data has not been collected, or may be used to further refine the predictions related to user behavior. In a further embodiment, user demographics may be used to compare the current user to other similar users based on user demographics and user activities may be correlated with other users to improve predictions of relevant searches.

In an additional embodiment, the search engine may receive feedback about the search results and use the received feedback to improve future predictions and future generated searches. Feedback may be received as an indication from the user that the search was helpful, or may be received by comparing visited locations (as may be determined by tracking the device's location) to previous searches to determine whether and which searches match up to visited locations. As an example, location data may indicate the user is in a specific restaurant in New York City. If a previously run search was for "restaurants in New York," the search engine may determine whether the specific restaurant was one of the results of the previously run search. If the restaurant was one of the results of the previously run search, this may confirm the search was effective, and a weighting factor or other machine learning parameter may be linked to that search or search result to enable future searches to learn from that success. In a further embodiment, feedback about a previously run predictive search may be provided to the user's second computing device and used to modify future user behavior predictions.

In an embodiment, the interactions between computing devices and the predictions may be handled and made by search engines resident on the various computing devices. While discussed in terms of a search engine, in another embodiment, the invention may be an independent application that creates search terms to be provided to a search engine or various search engines. In this embodiment, the user may enter search terms into the application running on a first computing device, and the application may perform the operations of the various embodiments to create tailored search terms better designed to return relevant results. In an embodiment, the application may then provide the tailored search terms to a search engine running on various computing devices. Thus, the search itself may be conducted within a user's computing device, within a server, and/or partially in a user's computing device and in a server working collaboratively.

FIG. 1 illustrates a communication system 100 suitable for use with the various embodiments. The communication system 100 may include a first computing device, shown as a laptop computer 102, second computing devices, shown as smart phones 104, 126, and 128, and a server 124 connected to the Internet 122. The laptop computer 102 may be in communication with a router 115 via a wired connection 114, and the router 115 may connect to the Internet 122. Additionally, the laptop computer 102 may establish a wireless connection 112, such as a Wi-Fi connection, with a wireless access point 111, such as a Wi-Fi access point. The wireless access point 111 may connect with the Internet 122. In this manner, via the connections to the wireless access point 111, router 115, and/or the Internet 122, data may be exchanged between the laptop computer 102 and the server 124.

The laptop computer 102 may also establish a wireless connection 106, such as a Bluetooth® connection, with the smart phone 104 and/or a wired connection 108, such as a USB connection. In this manner, via the connection 106, 108, data may be exchanged between the laptop computer 102 and the smart phone 104. Additionally, the smart phone 104 may establish a wireless connection 110, with the wireless access point 111. In this manner, data may be exchanged between the laptop computer 102 and the smart phone 104 via the Internet 122, as well as between the smart phone 104 and the server 124 via the Internet 122. Additionally, the smart phone 104 and a cellular tower or base station 118 may exchange data via a cellular connection 116, including CDMA, TDMA, GSM, PCS, 3G, 4G, LTE, or any other type wireless connection. The cellular tower or base station 118 may be in communication with a router 120 which may connect to the Internet 122. In this manner, via the connections to the cellular tower or base station 118 and/or the Internet 122, data may be exchanged between the smart phone 104 and the server 124 as well as between the smart phone 104 and the laptop computer 102.

Smart phones 126, 128 and a cellular tower or base station 118 may exchange data via a cellular connections 130, 132, respectively, including CDMA, TDMA, GSM, PCS, 3G, 4G, LTE, or any other type wireless connection. In this manner via the connections to the cellular tower or base station 118 and/or the Internet 122, data may be exchanged between the smart phones 126, 128 and the laptop computer 102, server 124, and/or smart phone 104.

In an embodiment, the laptop computer 102 and smart phone 104 may be devices owned/operated by the same user, while smart phones 126, 128 may be owned/operated by different users. In an embodiment, smart phones 104, 126, 128 may be configured to determine their respective locations, for example using GPS receivers, while the laptop computer 102 may not be configured to determine its location.

Figure 2:
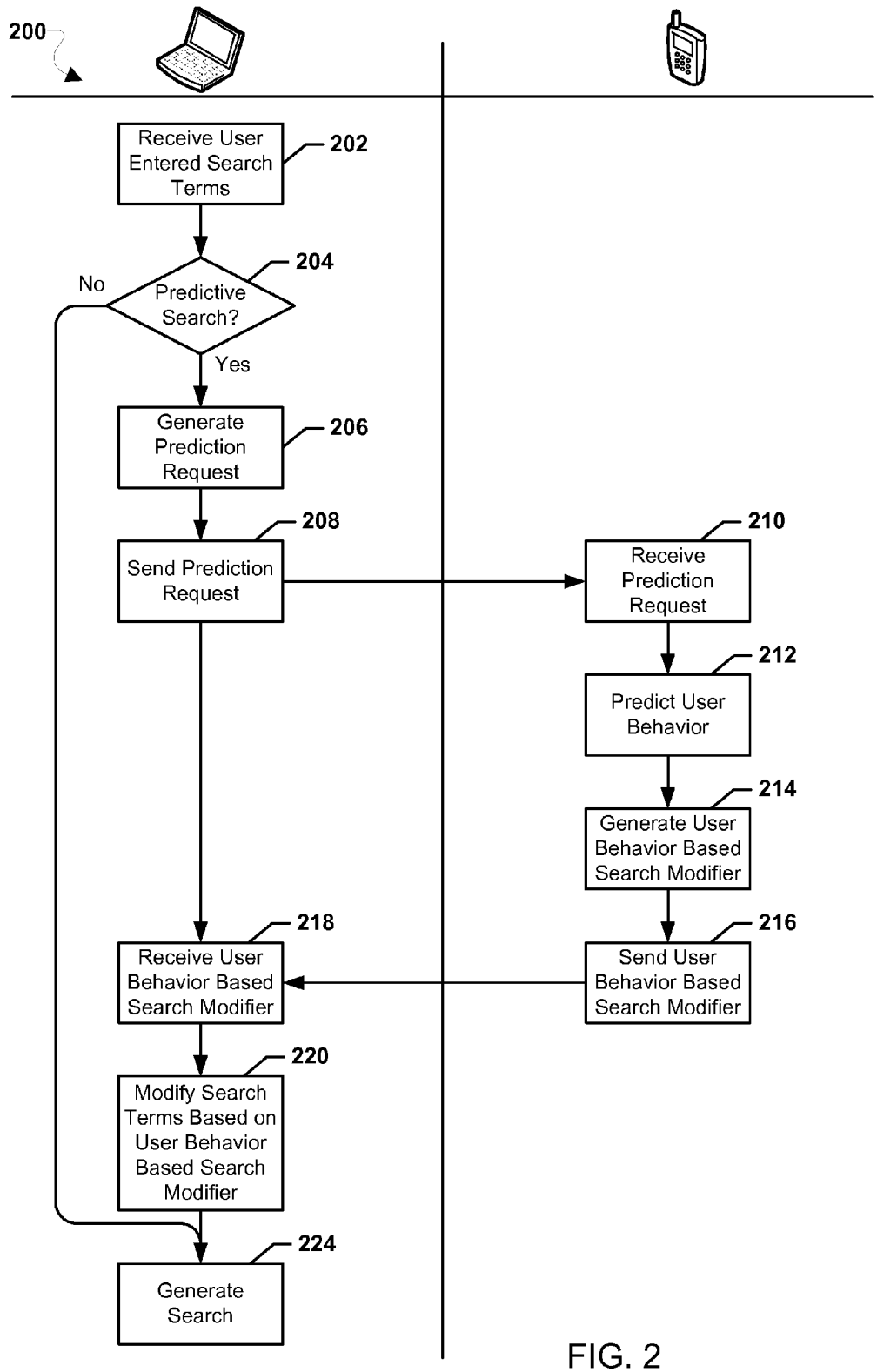
FIG. 2 is a process flow diagram illustrating an embodiment method for modifying a search based on predicted user behavior.

FIG. 2 illustrates an embodiment method 200 for modifying search terms entered into a user's first computing device based on predictions of the user behavior received from another computing device, which for ease of reference is referred to as the user's second computing device. In an embodiment, the operations of method 200 may be implemented by the processor of a user's first computing device, such as a user's laptop computer, and the processor of a second computing device, such as the user's smart phone. The two computing devices, such as the user's laptop computer and smart phone, may be configured to exchange data with one another via the various connections discussed above with reference to FIG. 1.

In FIG. 2, as well as FIGS. 3-8, the user's first computing device is illustrated as a laptop computer, and the user's second computing device is illustrated as being a smart phone. For ease of reference to the figures, the descriptions of the methods illustrated in FIGS. 2-8 refer to the user's first computing device as the user's laptop computer, and the user's second computing device as the user's smart phone. While these two types of user computing devices are likely to be a frequent application of the various embodiments, the illustrations and reference to such types of computing devices is merely for illustrative purposes, and is not intended to limit the scope of the claims.

In an implementation of method 200 in which the user's first computing device (e.g., a laptop computer) processor is running a search engine application, the user may enter search terms using a keyboard in block 202. In determination block 204, the laptop computer processor may determine whether the search terms correspond to a predictive search indication. In an embodiment, a predictive search indication may be an indication that the search will be relevant at a future time. In an embodiment, a predictive search indication may be a temporal term included in the search terms. Temporal terms may be terms entered by the user indicating a time regarding when the search will be relevant, such as "tonight" or "tomorrow."

In an embodiment, specific search terms may correspond to predictive search indications, such as commands. In an embodiment, the search terms may be compared to a lookup table resident in memory to determine whether one or more of the terms correspond to a predictive indication. In an embodiment, a predictive search indication may be an additional indication received with the search terms, such as a screen selection indication and/or user/device setting. In an embodiment, the act of entering search terms may be a predictive search indication. If the search terms do not correspond to a predictive search indication (i.e., determination block 204="No"), in block 224 the laptop computer processor may generate the search using the received user-entered search terms.

If the search terms correspond to a predictive search indication (i.e., determination block 204="Yes"), in block 206 the laptop computer processor may generate a prediction request message. A prediction request message may be a message generated by the laptop computer directing a second computing device, such as the smart phone, which asks the second computing device to make a prediction about the user's behavior. In an embodiment, the prediction request message may include at least a portion of the user-entered search terms. Prediction request messages may include additional information as discussed further below with reference to FIG. 9. In block 208 the laptop computer processor may send the prediction request message to the smart phone and in block 210 the smart phone processor may receive the prediction request.

In block 212 the smart phone processor may predict a user behavior based on information regarding the user that is available to the processor. In an embodiment, predictions of a user behavior may include determining user information, determining the current state of the smart phone, determining whether the current state indicates a future change in state, and determining a likely future state, historical behavior, and/or recent behavior.

In an embodiment, predictions may be made based on information included in the received prediction request. As an example, in an embodiment in which the prediction request message identifies the user, information used to make predictions about the user may be restricted to information specifically associated with the user.

In an embodiment, predictions may be made based on information stored on the user's smart phone (or other computing device), such as information associated with a calendar application (e.g., task lists, appointments, meeting requests, calendar entries, etc.), information associated with a turn-by-turn navigation application, location database information, previous Internet search history information, device settings, user settings, contact lists, call/message history information, etc. As an example, if a calendar entry indicates that the user will be in New York City that night, the predicted user behavior for purposes of conducting a requested search may be simply that the user will be in New York City that evening.

In an embodiment, the prediction of user behavior may be made by determining past user activities, identifying the relative frequency of the past user activities, and selecting a past user activity with a relative frequency above a threshold as the predicted user behavior. As an example, the smart phone processor may use information from its location database to determine the past locations visited by the user over the last six months corresponding to the same time of day as the time when the prediction request message may have been received. The smart phone processor may identify the frequency associated with any one location, and may select the most frequent location as the predicted user behavior. User behavior prediction methods are discussed in more detail below with reference to FIG. 5.

In block 214 the smart phone processor may generate a user behavior based search modifier. A user behavior based search modifier may be a message generated by the smart phone including information with which to modify the user-entered search terms based at least in part on the predicted user behavior before the search is conducted. As discussed further below with reference to FIG. 10, in an embodiment, the user behavior based search modifier may include one or more additional search terms. In an embodiment, the additional search term may be the user predicted behavior. In a further embodiment, the user predicted behavior may be used to generate the one or more additional search terms. As an example, in a memory of the smart phone, predicted user behaviors may be associated with various search terms, such as in a data table, and the smart phone processor may compare the predicted user behavior to the search terms in memory to select one or more search terms to include in the user behavior based search modifier. In further embodiments, the user behavior based search modifier may include additional information as discussed in more detail below with reference to FIG. 10.

In block 216 the smart phone processor may send the user behavior based search modifier to the laptop computer, and in block 218 the laptop computer processor may receive the user behavior based search modifier. In block 220 the laptop computer processor may modify the search terms based on the user behavior based search modifier. As an example, in an embodiment in which the user behavior based search modifier includes an additional search term, the smart phone processor may add the additional search term to the user-entered search terms. In block 224 the laptop computer processor may conduct the search using the modified search terms. In an embodiment, the search may be conducted by a search engine application run by the user's first computing device (e.g., a laptop computer) processor. In another embodiment, the search may be conducted by the user's first computing device (e.g., a laptop computer) processor sending the modified search terms to one or more other computing devices, such as a server, for use in running a search on behalf of the user's computing device. The other computing device, such as the server, may then send the search results to the laptop.

Figure 3:
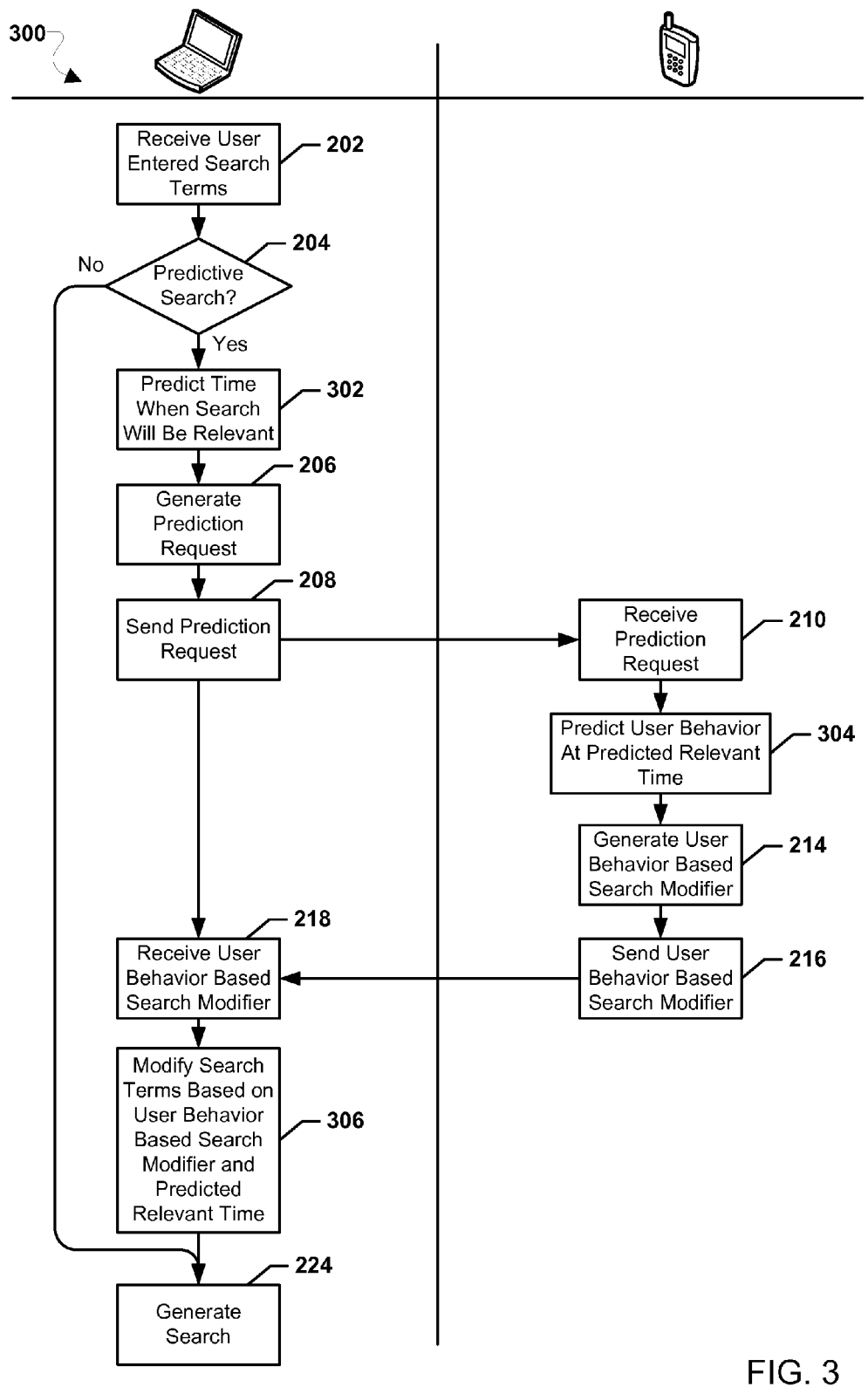
FIG. 3 is a process flow diagram illustrating an embodiment method for modifying a search based on predicted user behavior and a predicted time when the search will be relevant.

FIG. 3 illustrates an embodiment method 300 for modifying a search similar to method 200 described above with reference to FIG. 2, except that in method 300 the search terms may be modified based on the predicted user behavior and the predicted time when the search will be relevant. As discussed above, in block 202 the laptop computer processor may receive the user-entered search terms, and in block 204 the laptop computer processor may determine whether the search terms correspond to a predictive search indication. If the search terms correspond to a predictive search indication (i.e., determination block 204="Yes"), in block 302 the laptop computer processor may predict the time when the search will be relevant. In an embodiment, the laptop computer processor may predict the time when the search will be relevant based on the search terms. As discussed above, in an embodiment, the search terms may include temporal terms entered by the user indicating a time regarding when the search will be relevant, such as "tonight" or "tomorrow." In an embodiment, temporal terms may be associated with time windows stored in the laptop's memory, such as a lookup table cross referencing temporal terms with one or more standard and/or user defined time windows. As an example, the temporal term "tomorrow" may be associated with the time window corresponding to the next calendar day. As another example, the temporal term "tonight" may be associated with a time window ranging from six o'clock PM to midnight. In an additional embodiment, user-entered search terms may include a specific time/date when the search will be relevant and that specific time/date may be used by the laptop computer processor as the predicted time when the search will be relevant.

As discussed above, in block 206 the laptop computer processor may generate a prediction request message. As discussed further below, in an embodiment the generated prediction request message may include the predicted time when the search will be relevant. As discussed above, in block 208 the laptop computer processor may send the prediction request message to the smart phone, and in block 210 the smart phone processor may receive the prediction request message.

In block 304 the smart phone processor may predict a user behavior at the predicted time when the search will be relevant. In an embodiment, the smart phone processor may use the predicted time when the search will be relevant to focus/restrict the prediction of a user behavior. As an example, if the time when the search will be relevant is the next calendar day, information used to make predictions may be focused on/restricted to information related to the next calendar day, such as tasks for the next calendar day, calendar application information (e.g., task lists, appointments, meeting requests, calendar entries, etc.) scheduled for the next calendar day, device settings scheduled to take effect the next calendar day, and/or user settings scheduled to take effect the next calendar day. As discussed above, in block 214 the smart phone processor may generate a user behavior based search modifier, in block 216 the smart phone processor may send the user behavior based search modifier to the laptop computer, and in block 218 the laptop computer processor may receive the user behavior based search modifier.

In block 306 the laptop computer processor may modify the search terms based on the user behavior based search modifier and the predicted relevant time. In an embodiment, a time when the search will be relevant (e.g., a time window) may be added to the user-entered search terms along with any additional search terms in the user behavior based search modifier. In this manner, the modified search terms may include the time window, and the time window may be used by the device generating the search as a search term and/or to restrict the search results after they are generated. In a further embodiment, the time when the search will be relevant (e.g., a time window) may be substituted for an associated temporal term in the user-entered search terms. As discussed above, in block 224 the search may be generated using the modified search terms.

Figure 4:
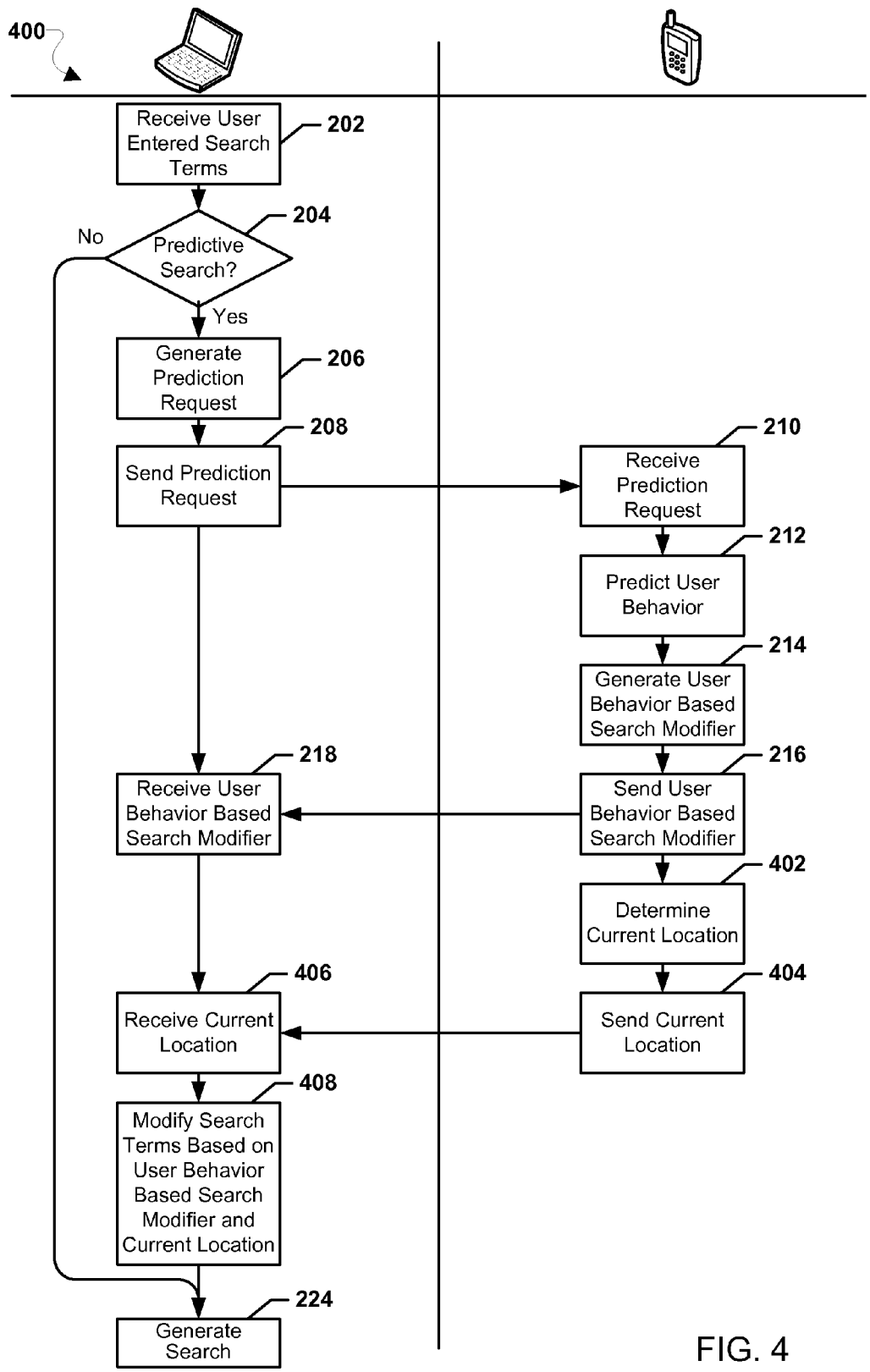
FIG. 4 is a process flow diagram illustrating an embodiment method for modifying a search based on predicted user behavior and a current location.

FIG. 4 illustrates an embodiment method 400 for modifying a search similar to method 200 described above with reference to FIG. 2, except that in method 400 the smart phone processor may send current location information to the laptop computer and the current location information may be used with the user behavior based search modifier to modify the search terms. In blocks 202, 204, 206, and 208 the laptop computer processor may perform operations of like numbered blocks of method 200 described above with reference to FIG. 2. In blocks 210, 212, 214, and 216 the smart phone processor may perform operations of like numbered blocks of method 200 described above with reference to FIG. 2. In block 218 the laptop computer processor may receive the user behavior based search modifier.

In block 402 the smart phone processor may determine the current location of the smart phone. In an embodiment, the smart phone processor may be configured to determine the current location of the smart phone automatically upon receiving a prediction request. As discussed further below, in an embodiment, a prediction request message may include a location request, and the receipt of a prediction request message including a location request may trigger the determination of the current smart phone location by the smart phone processor. In an embodiment, the smart phone may be configured to determine the smart phone's current location using a navigation system receiver, such as a Global Positioning System ("GPS") receiver. In an embodiment, the current location may be geographic coordinates, such as latitude and longitude values. In another embodiment, the geographic coordinates may be compared to point of interest information available to the smart phone processor to determine a place name corresponding to the geographic coordinates, such as "San Diego." In block 404 the smart phone processor may send the smart phone's current location to the laptop computer, and in block 406 the laptop computer processor may receive the smart phone's current location. In an embodiment, the current location may be sent in its own message, before, after, or in parallel with the user behavior based search modifier. In an alternative embodiment, the current location may be sent as part of the user behavior based search modifier.

In block 408 the laptop computer processor may modify the search terms based on the user behavior based search modifier and the current location. In an embodiment, the current location may be added to the user-entered search terms along with any additional search terms in the user behavior based search modifier. As an example, if the current location is San Diego, the term "San Diego" may be added to the user-entered search terms. As discussed above, in block 224 the search may be generated.

Figure 5:
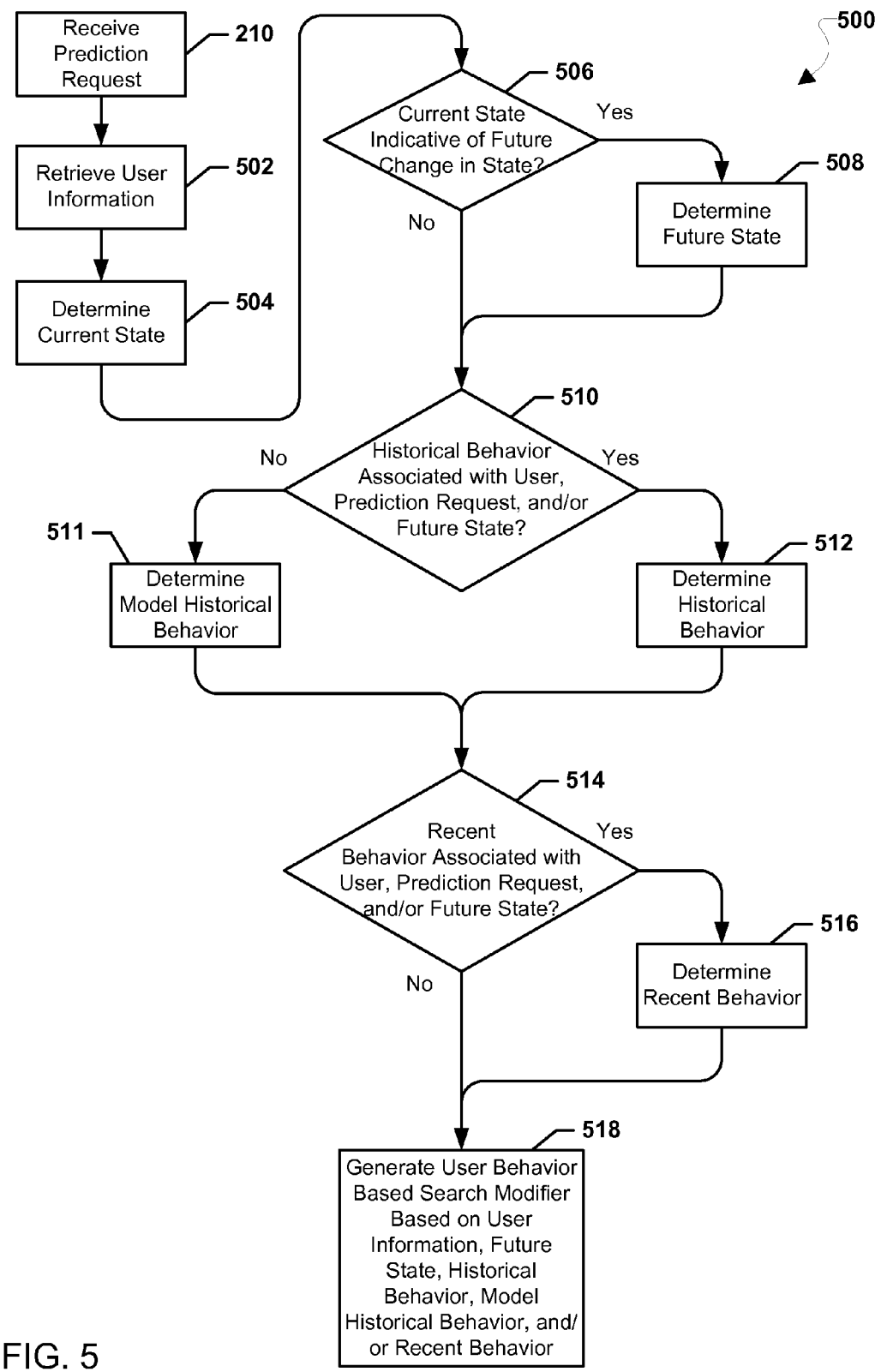
FIG. 5 is a process flow diagram illustrating an embodiment method for predicting user behavior.

FIG. 5 illustrates an embodiment method 500 for predicting user behavior and generating a user behavior based search modifier that may be used in conjunction with the various methods discussed herein. In an embodiment, the operations of method 500 may be performed by a processor of a user computing device, such as a smart phone. As discussed above, in block 210 the smart phone processor may receive a prediction request. As discussed below, in an embodiment, the prediction request message may include a user identification. In block 502 the smart phone processor may retrieve user information. In an embodiment, user information may include user settings, information from a user past behavior data base, group information (e.g., marketing groups the user may be associated with, address book application contact lists, and/or other registered users of the same device), previous search information, previous location information, historical user behavior information, recent user behavior information, etc.

In block 504 the smart phone processor may determine the smart phone's current state. In an embodiment, current state information may include the current time as determined by the smart phone, the date, information about the current applications being run on the smart phone, the smart phone's current velocity (i.e., speed and direction of travel), information received from sensors on the smart phone, and/or information about the current smart phone settings. In block 506 the smart phone processor may determine whether the current state indicates or can be used to predict a future change in state. In an embodiment, as part of the operations in block 506 the smart phone processor may compare the determined current state information to information stored in a memory of the smart phone that correlates current state information to future state information based on the user's past behavior. For example, this process may involve performing a look up operation on a data table stored in memory of the smart phone that correlates the user's past behavior to particular locations and device states. This data table may be developed by the smart phone by observing the user's behavior over time to identify correlations between state and location information and subsequent changes in state and location. With such a data table stored in memory, the smart phone may perform a table lookup using the current state and/or location information as a lookup criteria to obtain one or more correlated future states and/or locations. A plurality of current states to determine whether they indicate or predict a future changes in state, to determine whether a current state may be indicative of a future change in state. As an example, if the current location of the smart phone is in the parking lot of the user's office and the smart phone processor is running a turn by turn navigation application, the smart phone processor may determine from this information a future in state is about to occur (the current state is indicative of a future change in state).

If the smart phone processor that the current state indicates that a future change in state may occur (i.e., determination block 506="Yes"), in block 508 the processor may predict a likely future state based upon the current state information. In an embodiment, the processor may use information stored in a memory of the smart phone, such as a data table correlating current states to future states based on the user's past behavior, to look up a future state or states correlated to the current state information. In another embodiment, the smart phone processor may be configured to predict the future state based on information available to the processor based on the current state. As an example, if the smart phone's current state is in the office parking lot running a turn by turn navigation application, the processor may use the destination information and predicted arrival time available in the navigation application to predict the time and location for conducting a search. For example, if the user is following a route starting in the office parking lot in San Diego and terminating in New York City, the processor may use the travel path and/or arrival time predictions from the navigation application to determine future states of the smart phone will be in Colorado that night, Indiana the next night, and New York City the following night.

Whether the current state indicates a future change in state (in which case the future state would be predicted in block 508) or not (i.e., determination block 506="No"), in determination block 510 the smart phone processor may determine whether a historical behavior associated with the user, prediction request, and/or the future state. In an embodiment, the smart phone processor may have access to a user behavior database maintained on the smart phone. As an example, a user behavior database may contain historical behavior information related to a user's travel patterns, activity patterns, past searches, and/or places or topics of interest. Information in the prediction request, such as search terms, and/or the future state may be compared to user historical behaviors to determine whether a user historical behavior is associated with the user prediction request message and/or the future state. If the user, predication request, and/or future state are associated with a historical behavior (i.e., determination block 510="Yes"), in block 512 the smart phone processor may determine the historical behavior. As an example, if the prediction request message includes the search terms "restaurant tonight," based on information in the user behavior database the historical behavior may be determine to be that the user always goes to a sports bar on Monday nights.

If a historical behavior is not associated with the user, predication request, and/or future state (i.e., determination block 510="No"), in block 511 the smart phone processor may determine a model historical behavior. In an embodiment, a model historical behavior may be a likely behavior associated with the user, predication request, and/or future state derived from sampling of other similar users' behavior and/or statistical models of likely behavior based on the user, predication request, and/or future state. In an embodiment, the smart phone processor may have access to a database of model historical behavior and may determine model historical behavior by comparing the user, predication request, and/or future state to the database of model historic behavior. In this manner, though the smart phone processor may not have historical behavior associated with the user, predication request, and/or future state, data may be made available to the smart phone processor with which to make predictions and generate a user behavior search modifier.

In block 514, the smart phone processor may determine whether recent user behavior may be associated with the user, prediction request, and/or future state. In an embodiment, the smart phone processor may have access to recent behavior information, such as a user's calendar application, Twitter® account, Facebook® account, recent user movements (e.g., location changes), and/or other recent searches run by the user. The smart phone processor may compare information about the user, information in the prediction request, and/or the future state information to the recent user behavior information to determine whether a recent behavior is associated with the user, prediction request, and/or future state information. If a recent behavior is associated with the user, prediction request, and/or future state information (i.e., determination block 514="Yes"), in block 516 the smart phone processor may determine the recent behavior. As an example, if a recent search was for a hotel in Colorado and the user followed a specific link for a hotel in Colorado returned in the search, the recent user behavior may be determined to be that the hotel in Colorado associated with the link the user followed. If no recent behavior is associated with the user, prediction request, and/or future state information (i.e., determination block 514="No"), the smart phone processor may proceed to block 518.

In block 518 the smart phone processor may generate a user behavior based search modifier based on the user information, future state, historical behavior, model historical behavior, and/or recent behavior. In an embodiment, the user behavior based search modifier may include additional search terms to be added to the user-entered search. In an embodiment, the additional search terms may be the user information, future state, historical behavior, model historical behavior, and/or recent behavior. In a further embodiment, the user information, future state, historical behavior, model historical behavior, and/or recent behavior may be used to generate the one or more additional search terms. As an example, in a memory of the smart phone the user information, future state, historical behavior, model historical behavior, and/or recent behavior may be associated with various search terms, such as in a data table, and the smart phone processor may compare the user information, future state, historical behavior, model historical behavior, and/or recent behavior to the search terms in memory to select one or more search terms to include in the user behavior based search modifier.

Figure 6:
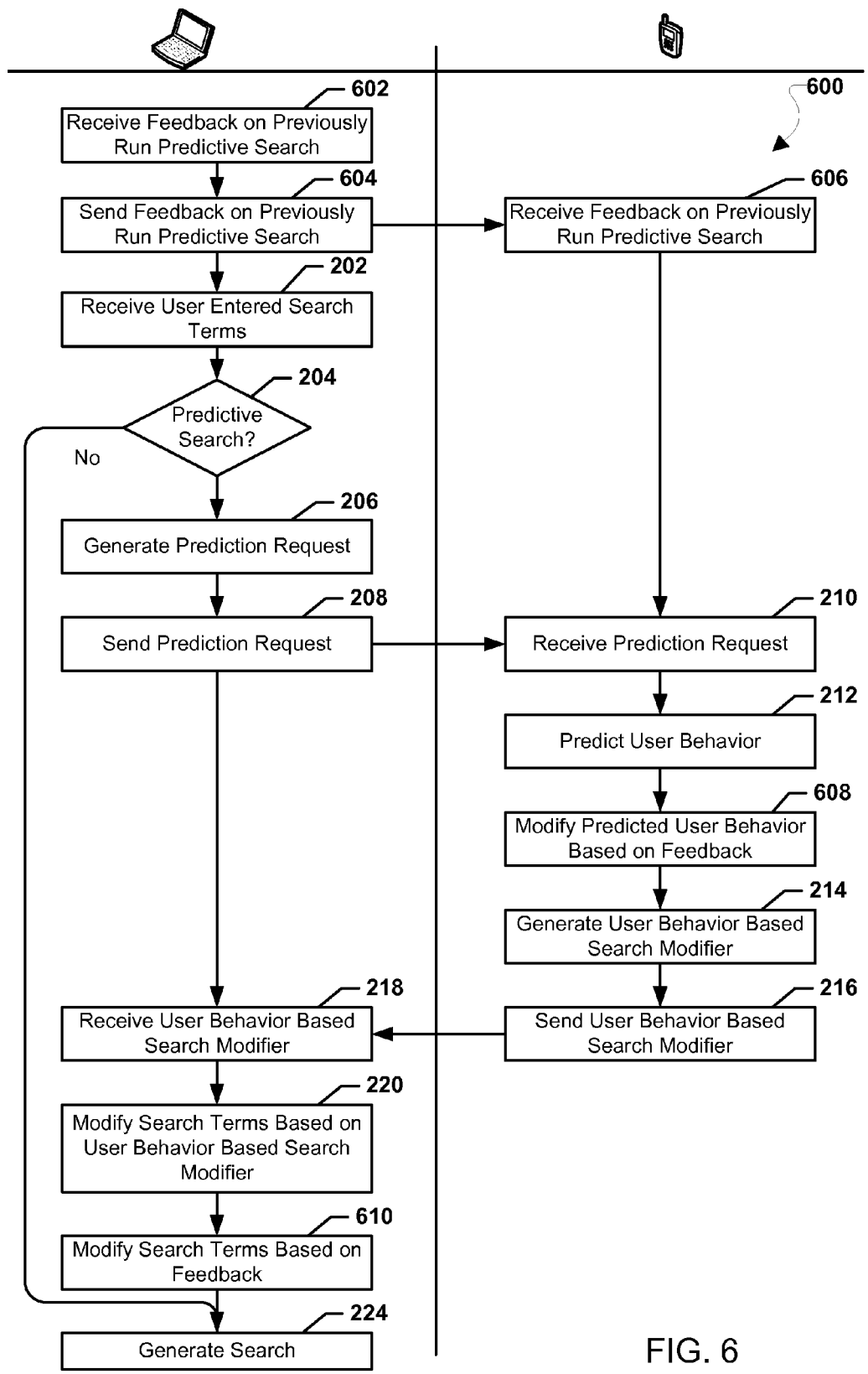
FIG. 6 is a process flow diagram illustrating an embodiment method for modifying search terms based on feedback from previously generated searches.

FIG. 6 illustrates an embodiment method 600 for modifying search terms similar to method 200 described above with reference to FIG. 2, except that in method 600 feedback from previously generated searches may be used to modify the predicted user behavior and/or the search terms. In block 602 the laptop computer processor may receive feedback on a previously run predictive search. In an embodiment, the laptop computer processor may receive feedback about the search results generated from previously modified search terms and use the received feedback to improve future predictions. In an embodiment, feedback may be received as an indication from the user that the search was helpful, or may be received by comparing visited locations (as may be determined by tracking user locations) to previous searches to determine whether and which searches match up to visited locations. As an example, location data may indicate the user is in a specific restaurant in New York City. If a previously run search was for "restaurants in New York," the laptop computer processor may determine whether the specific restaurant was one of the results of the previously run search. If the restaurant was one of the results of the previously run search, this may confirm the search was effective, and a weighting factor or other machine learning parameter may be linked to that search or search result to enable future searches to learn from that success. In an embodiment the laptop computer processor may generate feedback itself and/or receive feedback generated by another device, such as a server that may have generated the previous search.

In block 604 the laptop computer processor may send the feedback on the previously run predictive search to the smart phone, and in block 606 the smart phone processor may receive the feedback on the previously run predictive search. In blocks 202, 204, 206, and 208 the laptop computer processor may perform operations of like numbered blocks of method 200 described above with reference to FIG. 2. In blocks 210 and 212 the smart phone processor may perform operations of like numbered blocks of method 200 described above with reference to FIG. 2. In block 608 the smart phone processor may modify the predicted user behavior based on the received feedback on a previously run predictive search. In an embodiment, modifying the predicted behavior based on the feedback may include changing weighting factors or other machine learning parameters and modifying the predicted user behavior based on the changes. As an example, based on the received feedback the original most likely predicted behavior may be replaced with the second most likely predicted behavior. As another example, based on the received feedback the predicted behavior may be refined, for example a predicted behavior of staying at a hotel may be modified to staying at a hotel with a pool based on feedback indicating a user previously selected hotel search results in which the hotels had a pool.

In blocks 214 and 216 the smart phone processor may perform operations of like numbered blocks of method 200 described above with reference to FIG. 2. As discussed above, in block 218 the laptop computer processor may receive the user behavior based search modifier, and in block 220 may modify the search terms based on the user behavior based search modifier. In block 610 the laptop computer processor may modify the search terms based on the received feedback on a previously run predictive search. In an embodiment, modifying the search terms based on the feedback may include changing weighting factors or other machine learning parameters and modifying the search terms based on the changes. As an example, based on the received feedback a specific temporal term, such as "this evening", may be identified as previously returning non-useful results, and the laptop computer processor may modify the search terms by using the search term "tonight" instead of the entered phrase "this evening." In block 224 the search may be generated.

Figure 7:
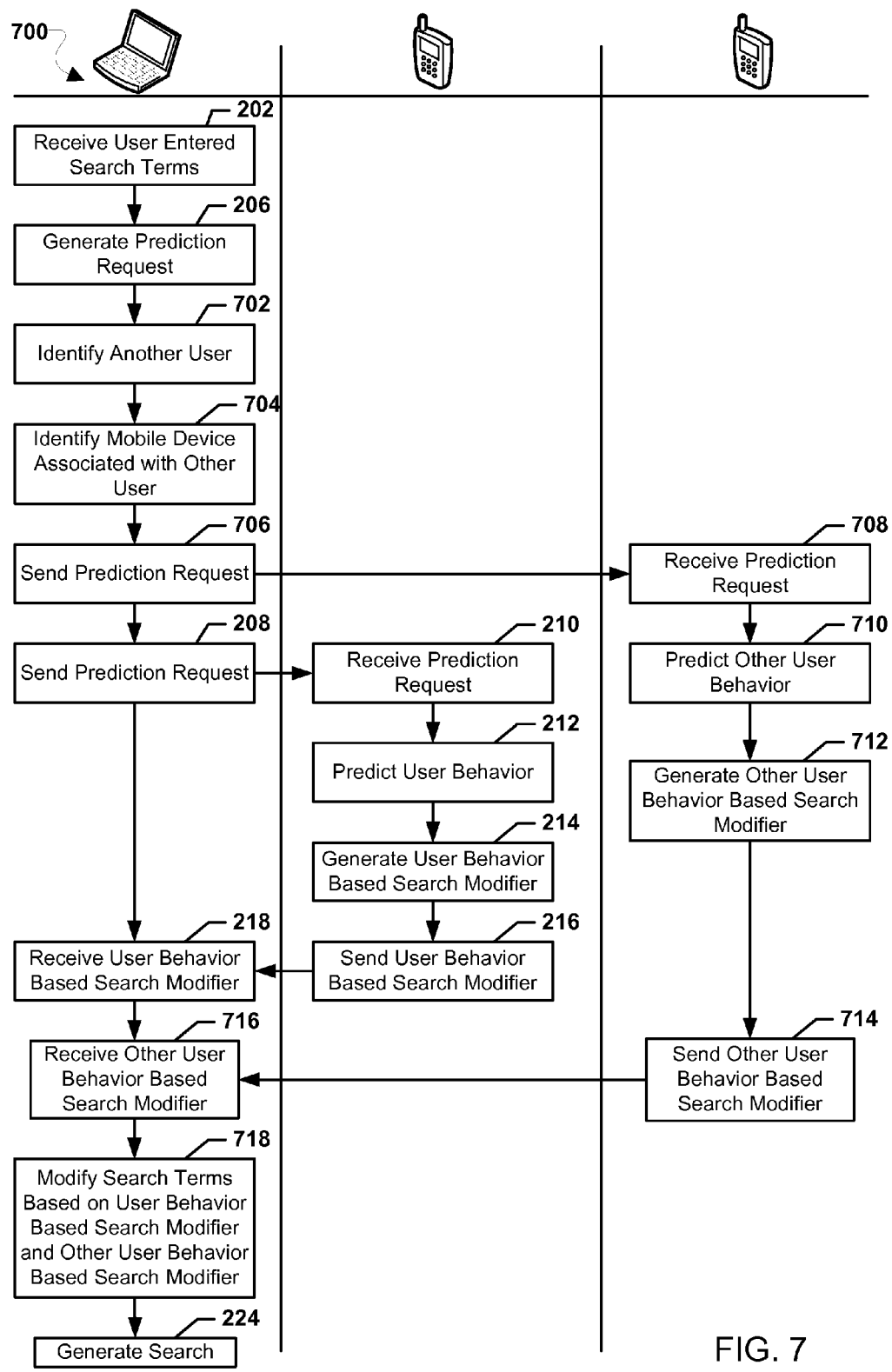
FIG. 7 is a process flow diagram illustrating an embodiment method for modifying a search based on another user's predicted behavior.

FIG. 7 illustrates an embodiment method 700 for modifying search terms similar to method 200 described above with reference to FIG. 2, except that in method 700 search terms may be modified based on another user's predicted behavior. In an embodiment, the operations of method 700 may be implemented by the processor of a first computing device, such as a user's laptop computer, and the processor of a second computing device, such as the user's smart phone, and the processor of a third device, such as a smart phone belonging to a different user. The laptop computer, smart phone, and other user's smart phone may be configured to exchange data with one another via the various connections discussed above with reference to FIG. 1. While discussed in terms of modifying search based on only one other user's predicted behavior, the operations of method 700 may be performed to gather predicted behavior inputs from multiple other users and modify the search terms based on those multiple other users' behaviors.

As discussed above, in block 202 the laptop computer processor may receive the user-entered search terms, and in block 206 may generate the prediction request. As discussed further below, in an embodiment, the prediction request message may include a user identification, such as the user ID for the user of the laptop. In block 702 the laptop computer processor may identify another user. In an embodiment, the laptop computer processor may identify another user based on the search terms. In an embodiment, specific search terms may be associated with a group, such as a marketing group, friends list, etc, and/or specific individuals. As an example, another user may be designated as a close friend, and the laptop computer processor may be configured to associate food related searches with the close friend's user identification. In block 704 the laptop computer processor may identify a mobile device associated with the identified other user. In an embodiment, the laptop computer processor may have access to a mobile device ID database associating users with their respective mobile devices, and may identify the mobile device associated with the identified user by accessing the mobile device ID database. In block 706 the laptop computer processor may send the prediction request message to the other user's smart phone, and in block 708 the other user's smart phone may receive the prediction request. In parallel, as discussed above, in block 208 the laptop computer processor may send the prediction request message to the smart phone. In blocks 210, 212, 214, and 216, the smart phone may perform operations of like numbered blocks of method 200 discussed above with reference to FIG. 2.

In block 710 the other user's smart phone processor may predict the other user's behavior. In an embodiment, the predictions made by the other user's smart phone may be similar to the predictions made in block 212 described above with reference to FIG. 2, except that the predictions may be based on the other user's behavior rather than the laptop computer user's behavior. In an embodiment, prediction of the other user's behavior may include determining other user information, determining the current state of the other user's smart phone, determining whether the current state is indicative of a future change in state, and determining a likely future state, historical behavior, and/or recent behavior. In an embodiment, predictions may be made based on information included in the received prediction request. As an example, in an embodiment in which the prediction request message identifies the user of the laptop computer, information used to make predictions may be restricted to information available on the other user's device specifically associated with the laptop computer user. In an embodiment, predictions may be made based on information stored on the other user's smart phone, such as information associated with a calendar application (e.g., task lists, appointments, meeting requests, calendar entries, etc.), information associated with a turn-by-turn navigation application, location database information, previous Internet search history information, device settings, user settings, contact lists, call/message history information, etc.

In block 712 the other user's smart phone processor may generate another user behavior based search modifier. In an embodiment, the other user behavior based search modifier generated by the other user's smart phone may be similar to the user behavior based search modifier generated in block 212 described above with reference to FIG. 2, except that the generated other used behavior based search modifier may be based at least in part on the predicted other user's behavior. In block 714 the other user's smart phone may send the other user behavior based search modifier to the laptop computer, and in block 716 the laptop computer processor may receive the other user behavior based search modifier.

In block 718 the laptop computer processor may modify the search terms based on the user behavior based search modifier and the other user behavior based search modifier. In an embodiment the user behavior based search modifier and the other user behavior based search modifier may include additional search terms, and the user-entered search terms may be modified to further include the additional search terms. As discussed above, in block 224 the search may be generated.

Figure 8:
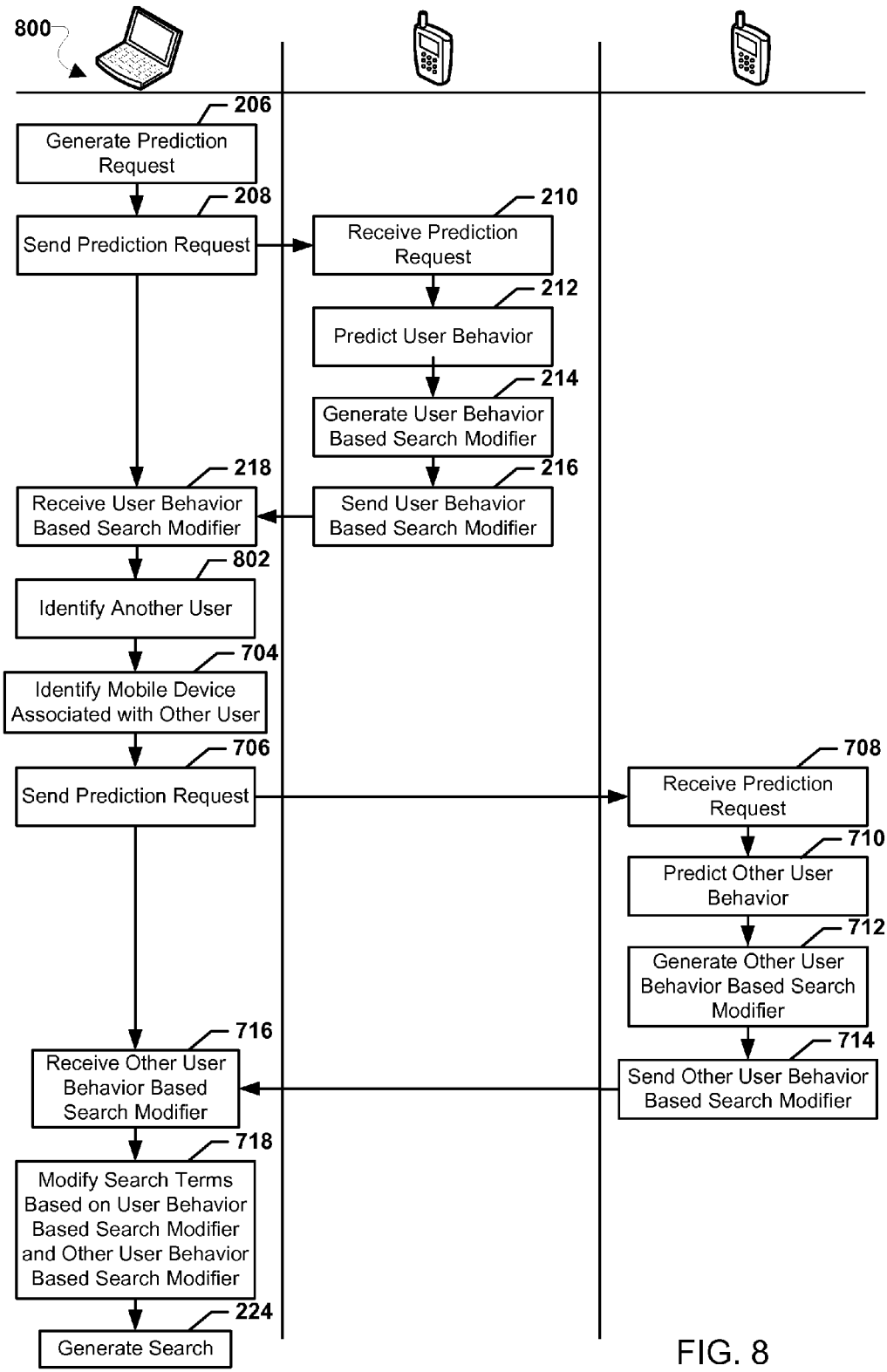
FIG. 8 is a process flow diagram illustrating a second embodiment method for modifying a search based on another user's predicted behavior.

FIG. 8 illustrates an embodiment method 800 for modifying search terms similar to method 700 described above with reference to FIG. 7, except that in method 800 the other user may be identified based on the user-behavior-based search modifier received from the user's second computing device (e.g., a smart phone). While the embodiments are discussed in terms of modifying a search based on only one other user's predicted behavior, the operations of method 800 may be performed to gather predicted behavior inputs from multiple other users (i.e., a plurality of other users) and modify the search terms based on those multiple other users' behaviors. Thus, references to another user in the following description of method 800 and in the claims are intended to encompass one or more other users and one or more other user behavior-based search modifiers.

In method 800 in blocks 206 and 208 the laptop computer processor may perform operations of like numbered blocks of method 200 described above with reference to FIG. 2. In blocks 210, 212, 214, and 216 the smart phone processor may perform operations of like numbered blocks of method 200 described above with reference to FIG. 2. As discussed above, in block 218 the laptop computer processor may receive the user behavior based search modifier.

In block 802 the laptop computer processor may identify another user. In an embodiment, the laptop computer processor may identify the other user based on the user behavior based search modifier. In an embodiment, the user behavior based search modifier may include an additional search term, and the laptop computer processor may identify another user based on that additional search term. In an embodiment, a specific search term may be associated with a group, such as a marketing group, friends list, etc, and/or specific individuals. As an example, another user may be designated as a close friend, and the laptop computer processor may be configured to associate a specific search term with the close friend's user identification. In another embodiment, the user behavior based search modifier itself may include group/other user identification information as discussed further below. The group information may be used by the laptop computer processor to identify another user and/or a group of other users. In blocks 704 and 706 the laptop computer processor may perform operations of like numbered blocks of method 700 described above with reference to FIG. 7. In blocks 708, 710, 712, and 714 the other user's smart phone processor may perform operations of like numbered blocks of method 700 described above with reference to FIG. 7. In blocks 716, 718, and 224 the laptop computer processor may perform operations of like numbered blocks of method 700 described above with reference to FIG. 7.

Figure 9:
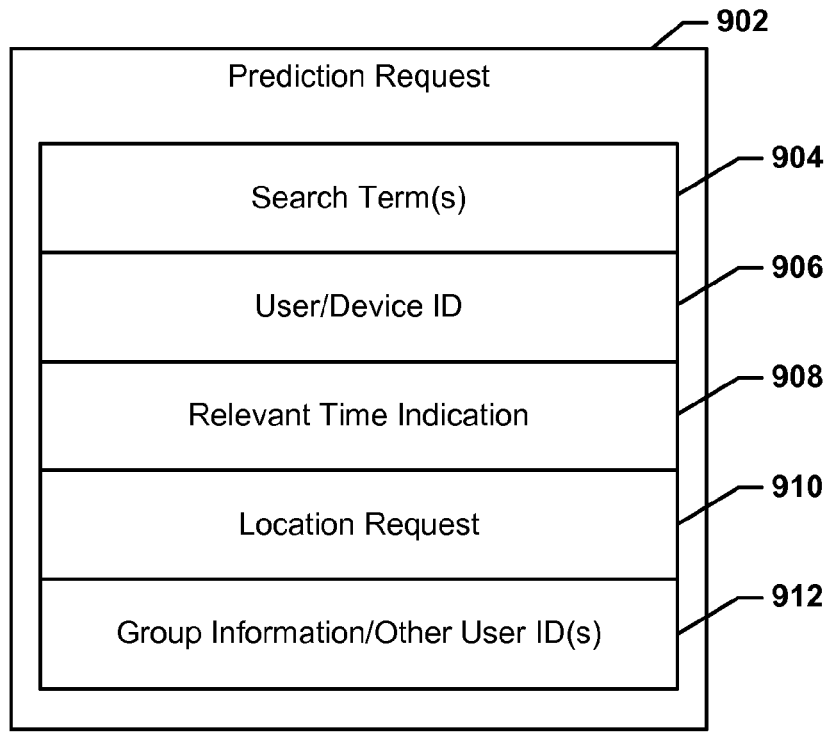
FIG. 9 is a data structure diagram illustrating potential elements of a prediction request.

FIG. 9 is a data structure diagram illustrating potential elements of a prediction request message 902. In an embodiment, a prediction request message 902 may be a message sent from a first computing device to a second computing device requesting the second computing device predict a user behavior. A prediction request message 902 may include one or more of the search terms 904 entered by the user. A prediction request message 902 may include a user and/or device ID 906 associated with the device generating the prediction request message 902. A prediction request message 902 may include a relevant time indication 908. As an example, a relevant time indication 908 may be a predicted time period (i.e., time window) at which the search will be relevant. A prediction request message 902 may include a location request 910. As an example, a location request 910 may be an indication to the second computing device to respond to the prediction request message with the second computing device's current location information, such as the second computing device's current GPS coordinates. A prediction request message 902 may include group information and/or other user IDs 912. As an example, group information and/or other user IDs 912 may include marketing group information, call/message group information, and/or user IDs associated with contact, buddy, and/or friend lists associated with the first computing device and/or its user.

Figure 10:
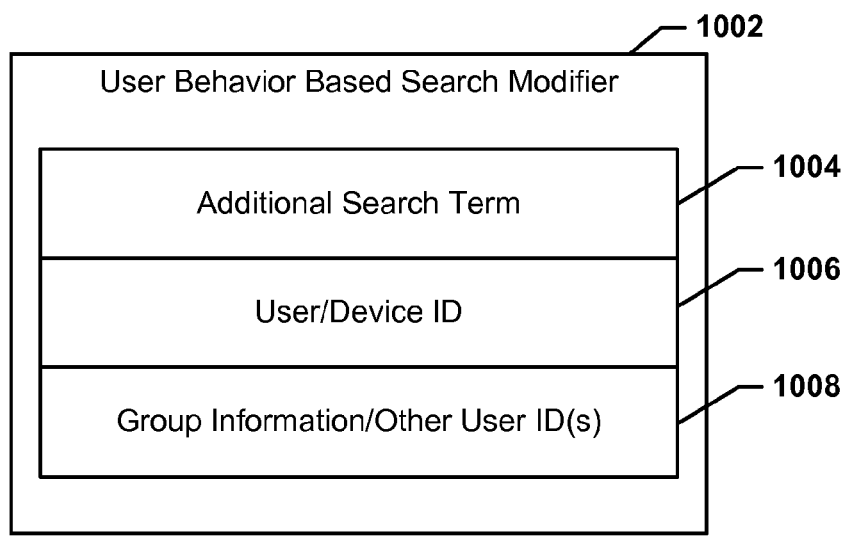
FIG. 10 is a data structure diagram illustrating potential elements of a user behavior based search modifier.

FIG. 10 is a data structure diagram illustrating potential elements of a user behavior based search modifier 1002. In an embodiment, a user behavior based search modifier 1002 may be generated based at least in part on a predicted user behavior. A user behavior based search modifier 1002 may include one or more additional search terms 1004. A user behavior based search modifier 1002 may include a user/device ID 1006. As an example, the user/device ID 1006 may be the user and/or device ID associated with the device that generated the user behavior based search modifier 1002. A user behavior based search modifier 1002 may include group information/ other user IDs 1008. As an example, group information and/or other user IDs 1008 may include marketing group information, call/message group information, and/or user IDs associated with contact, buddy, and/or friend lists associated with the device and/or user of the device that generated the user behavior based search modifier 1002.

Figure 11:
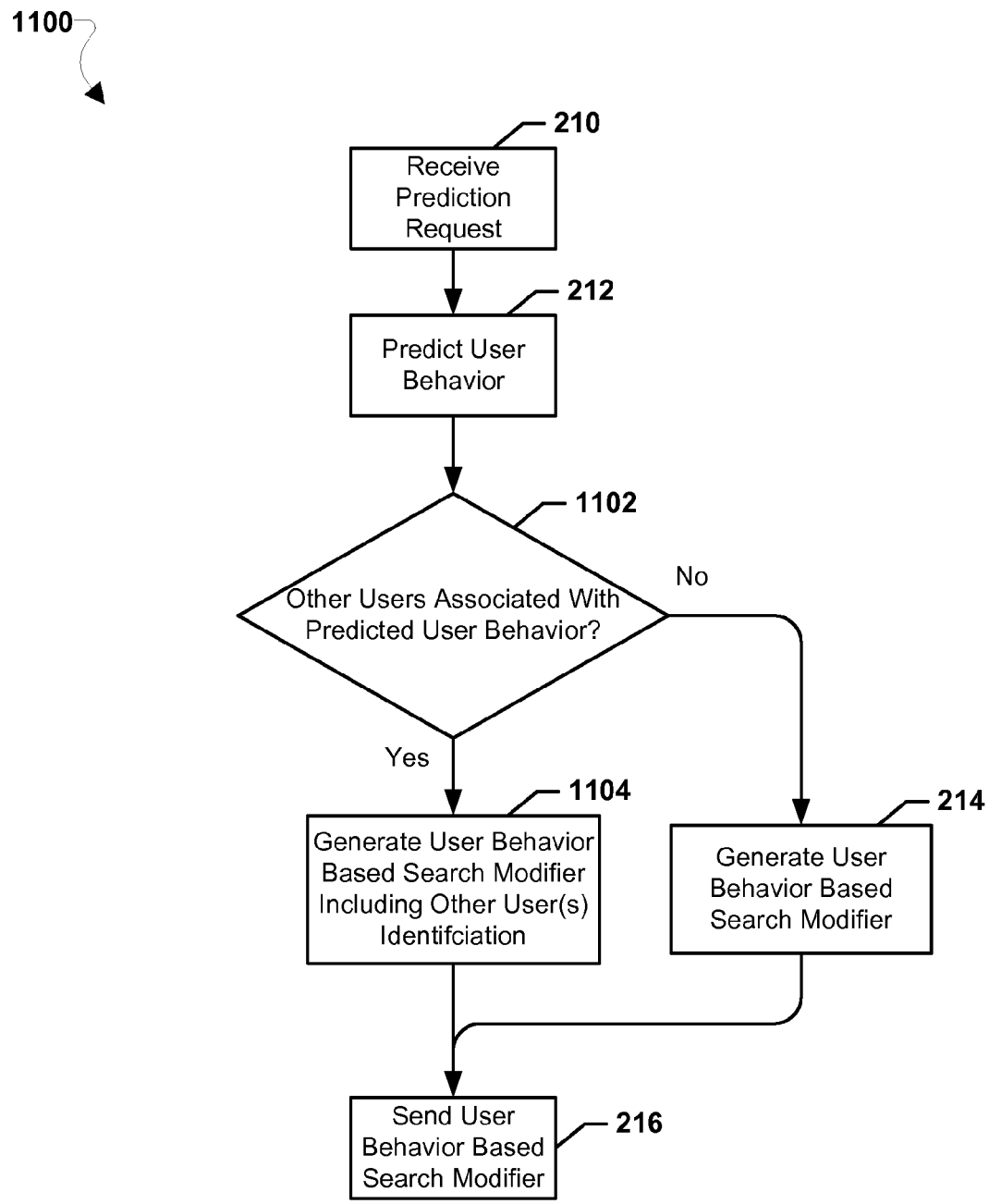
FIG. 11 is a process flow diagram illustrating an embodiment method for generating user behavior based search modifiers.

FIG. 11 illustrates an embodiment method 1100 for generating user behavior based search modifiers that may be used in conjunction with the methods discussed herein. In an embodiment, the operations of method 1100 may be performed by a processor of a user computing device, such as a smart phone. As discussed above, in block 210 the smart phone processor may receive a prediction request, and in block 212 the smart phone processor may predict a user behavior.

In determination block 1102 the smart phone processor may determine whether other users may be associated with the predicted user behavior. In an embodiment, the smart phone processor may determine whether other users are associated with the predicted user behavior by analyzing the data elements used to predict the user behavior to determine whether other user information is included with those data elements. As an example, if the prediction of the user behavior was based on a meeting request in a user's calendar application, the meeting request may be analyzed to determine whether the meeting request identifies the meeting invitees. If no other users are associated with the predicted user behavior (i.e., determination block 1102="No"), as discussed above in block 214 the smart phone processor may generate the user behavior based search modifier, and in block 216 the smart phone processor may send the user behavior based search modifier. If other users are associated with the predicted user behavior (i.e., determination block 1102="Yes"), in block 1104 the smart phone processor may generate a user behavior based search modifier including the other users' identifications. In an embodiment, the other users' identifications may be user/device IDs of the other users associated with the predicted user behavior. In this manner, the device receiving the generated user behavior based search modifier may receive indications of the other users associated with the predicted user behavior. As discussed above, in block 216 the smart phone processor may send the user behavior based search modifier.

Figure 12:
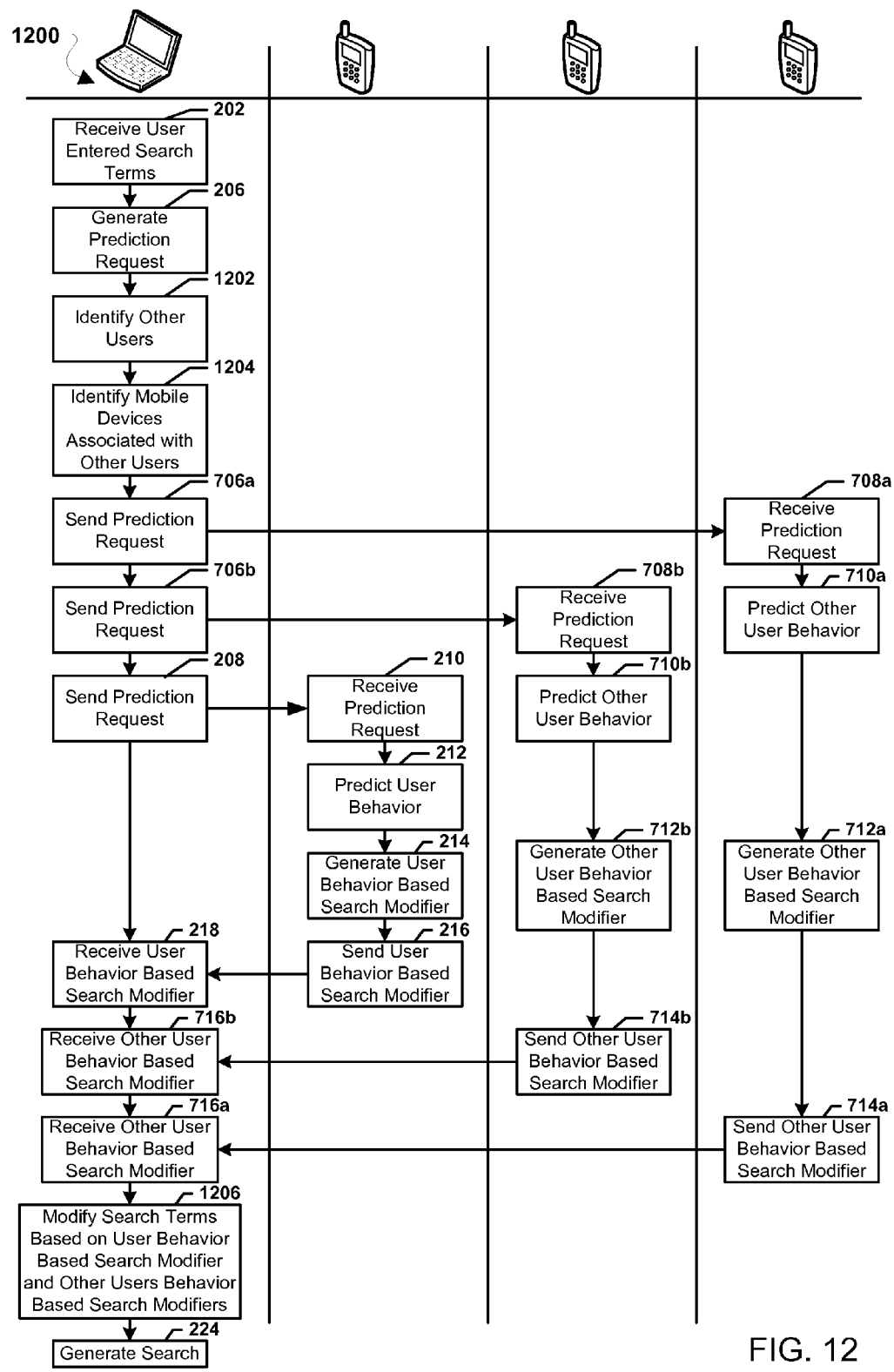
FIG. 12 is a process flow diagram illustrating an embodiment method for modifying a search based on multiple other users' predicted behaviors.

FIG. 12 illustrates an embodiment method 1200 for modifying search terms similar to method 700 described above with reference to FIG. 7, except that in method 1200 the search terms may be modified based on predicted behavior inputs from multiple other users. In an embodiment, the operations of method 1200 may be implemented by the processor of a first computing device, such as a user's laptop computer, the processor of a second computing device, such as the user's smart phone, the processor of a third device, such as a smart phone belonging to a first different user, and the processor of a fourth device, such as a smart phone belonging to a second different user. The laptop computer, smart phone, first other user's smart phone, and second other user's smart phone may be configured to exchange data with one another via the various wired and wireless data connections discussed above with reference to FIG. 1. While discussed in terms of modifying a search based on two other users' predicted behaviors, the operations of method 1200 may be performed to gather predicted behavior inputs from any number of additional other users, such as three, four, five, etc., and modify the search terms based on those multiple other users' behaviors.

As discussed above, in block 202 the laptop computer processor may receive the user-entered search terms, and in block 206 may generate the prediction request. As discussed above, in an embodiment, the prediction request message may include a user identification, such as the user ID for the user of the laptop. In block 1202 the laptop computer processor may identify other users. In an embodiment, the laptop computer processor may identify other users based on the search terms. In an embodiment, specific search terms may be associated with a group, such as a marketing group, friends list, etc., and/or specific individuals. As an example, other users may be designated as friends, and the laptop computer processor may be configured to associate food related searches with the friend's user identifications. In block 1204 the laptop computer processor may identify mobile devices associated with the identified other users. In an embodiment, the laptop computer processor may have access to a mobile device ID database associating users with their respective mobile devices, and may identify the mobile devices associated with the identified users by accessing the mobile device ID database. In blocks 706a and 706b, respectively, the laptop computer processor may perform the operations of block 706 of method 700 discussed above with reference to FIG. 7 to send the prediction request message to the each of the other users' smart phones. In blocks 708a and 708b the other users' smart phones, respectively, may receive the prediction request in a manner similar to that discussed above with reference to block 708 of method 700 discussed above with reference to FIG. 7. In parallel, as discussed above, in block 208 the laptop computer processor may send the prediction request message to the user's smart phone. In blocks 210, 212, 214, and 216, the user's smart phone may perform operations of like numbered blocks of method 200 discussed above with reference to FIG. 2.

In blocks 710a and 710b the other users' smart phone processors, respectively, may predict their respective other user's behavior in a manner similar to that discussed above with reference to block 710 of method 700 discussed above with reference to FIG. 7. In blocks 712a and 710b the other users' smart phone processors, respectively, may each generate another user behavior based search modifier in a manner similar to that discussed above with reference to block 710 of method 700 discussed above with reference to FIG. 7. In blocks 714a and 714b the other users' smart phones, respectively, may each send their respective other user behavior-based search modifier to the laptop computer in a manner similar to that discussed above with reference to block 714 of method 700 discussed above with reference to FIG. 7. In blocks 716a and 716b, respectively, the laptop computer processor may perform the operations of block 716 of method 700 discussed above with reference to FIG. 7 to receive the other users' behavior based search modifiers.

In block 1206 the laptop computer processor may modify the search terms based on the user behavior-based search modifier and the other users' behavior-based search modifiers. In an embodiment the user behavior-based search modifier and the other users' behavior-based search modifiers may include additional search terms, and the user-entered search terms may be modified to further include these additional search terms. In this manner, the user entered search terms may be modified based on the user's predicted behavior and/or predicted behavior inputs received from multiple other users. Using the modified search, in block 224 the search may be generated (i.e., executed).

Figure 13:
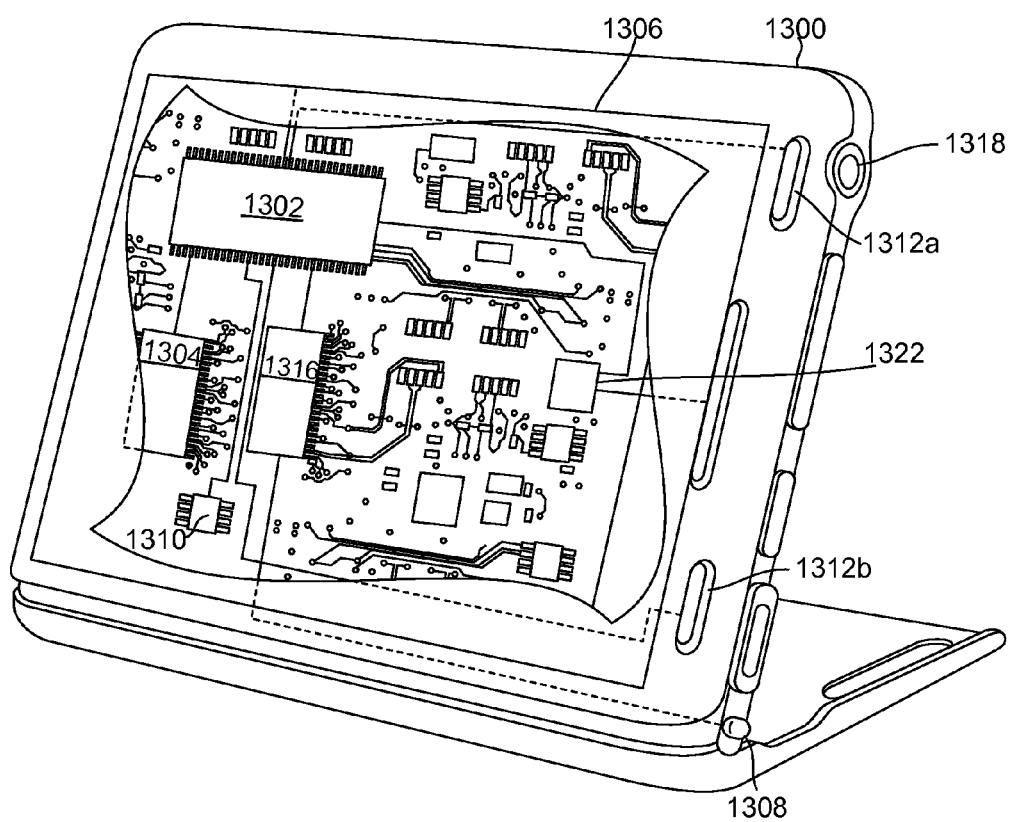
FIG. 13 is a component diagram of an example wireless device suitable for use with the various embodiments.

The various embodiments may be implemented in any of a variety of devices, an example of which is illustrated in FIG. 13. For example, the wireless device 1300 may include a processor 1302 coupled to internal memories 1304 and 1310. Internal memories 1304 and 1310 may be volatile or non-volatile memories, and may also be secure and/or encrypted memories, or unsecure and/or unencrypted memories, or any combination thereof. The processor 1302 may also be coupled to a user interface, such as a touch screen display 1306 (e.g., a resistive-sensing touch screen, capacitive-sensing touch screen infrared sensing touch screen, or the like), or conventional buttons (e.g., 1312a and 1312b) and a non-touch screen display. Additionally, the wireless device 1300 may include one or more network transceivers configured to enable the processor 1302 to communicate with other computing devices over one or more wired or wireless networks, such as the communication networks discussed above with reference to FIG. 1. As a particular example, the network transceivers of a wireless device 1300 may include one or more antenna 1308 for sending and receiving electromagnetic radiation that may be connected to one or more wireless data link transceiver and/or cellular telephone transceiver 1316 coupled to the processor 1302. The wireless device 1300 may also include physical buttons 1312a and 1312b for receiving user inputs. The wireless device 1300 may also include a power button 1318 for turning the wireless device 1300 on and off. The wireless device 1300 may also include a position sensor 1322, such as a GPS receiver, coupled to the processor 1302.

Figure 14:
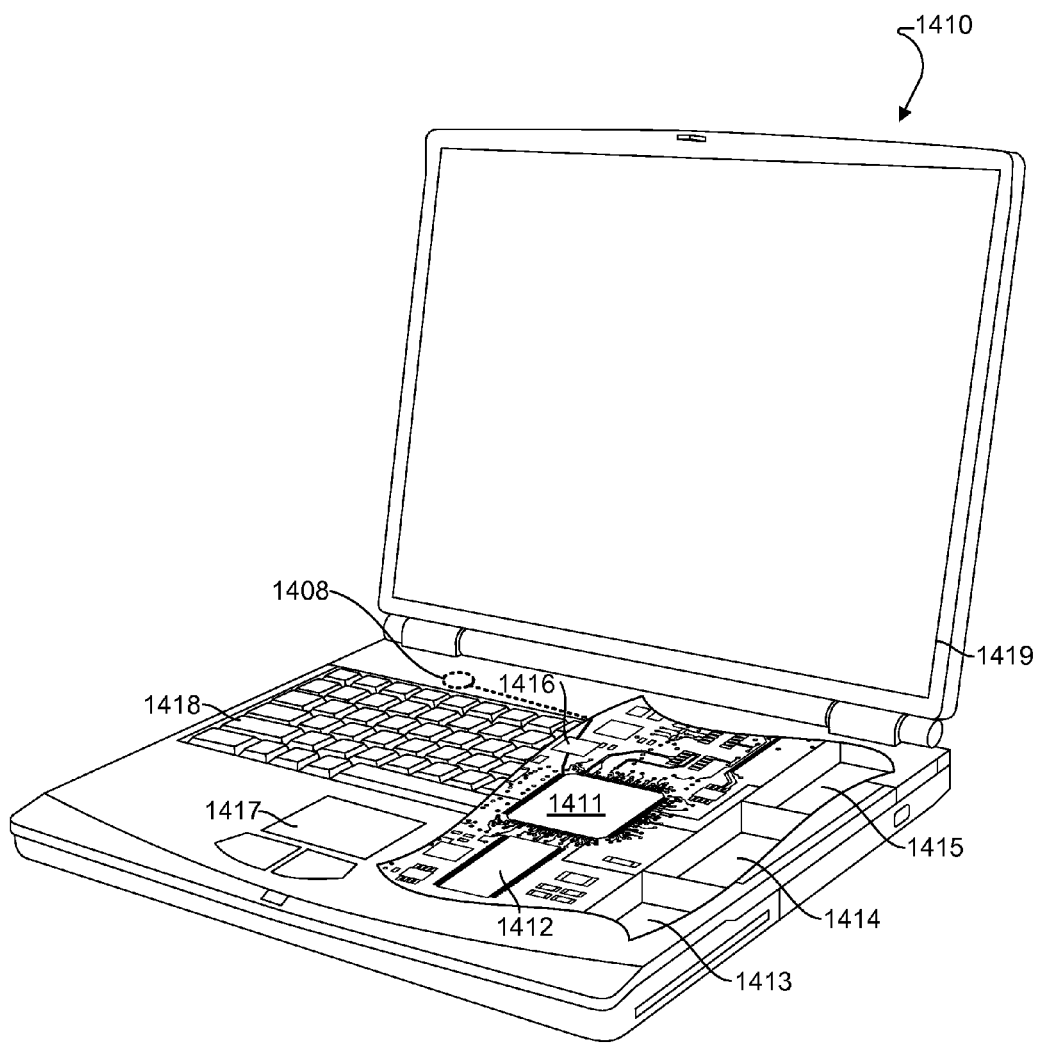
FIG. 14 is a component diagram of an example wireless device suitable for use with the various embodiments.

The various embodiments described above may also be implemented within a variety of personal computing devices, such as a laptop computer 1410 as illustrated in FIG. 14. Many laptop computers include a touch pad touch surface 1417 that serves as the computer's pointing device, and thus may receive drag, scroll, and flick gestures similar to those implemented on mobile computing devices equipped with a touch screen display and described above. A laptop computer 1410 will typically include a processor 1411 coupled to volatile memory 1412 and a large capacity nonvolatile memory, such as a disk drive 1413 of Flash memory. The laptop computer 1410 may also include a floppy disc drive 1414 and a compact disc (CD) drive 1415 coupled to the processor 1411. The laptop computer 1410 may also include a number of network transceivers or network connector ports coupled to the processor 1411 configured to enable the processor 1402 to communicate with other computing devices one or more wired or wireless networks, such as the communication networks discussed above with reference to FIG. 1. As a particular example, the network transceivers of a laptop computer 1410 may include Ethernet, USB or FireWire® connector sockets/transceivers, one or more wireless modem transceivers 1416, such as WiFi and/or cellular data network transceivers, coupled to one or more antenna 1408 for sending and receiving electromagnetic radiation. The laptop computer 1410 may also include other types of network connection circuits for coupling the processor 1411 to a network that may be developed in the future. In a notebook configuration, the computer housing includes the touchpad 1417, the keyboard 1418, and the display 1419 all coupled to the processor 1411. Other configurations of the computing device may include a computer mouse or trackball coupled to the processor (e.g., via a USB input) as are well known, which may also be used in conjunction with the various embodiments.

Figure 15:
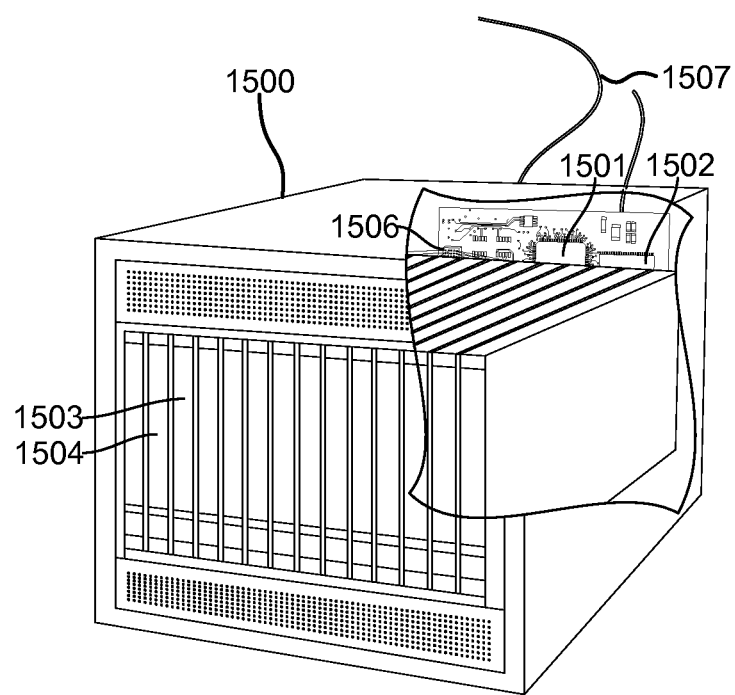
FIG. 15 is a component diagram of an example server suitable for use with the various embodiments

The various embodiments may also be implemented on any of a variety of commercially available server devices, such as the server 1500 illustrated in FIG. 15. Such a server 1500 typically includes a processor 1501 coupled to volatile memory 1502 and a large capacity nonvolatile memory, such as a disk drive 1503. The server 1500 may also include a floppy disc drive, compact disc (CD) or DVD disc drive 1504 coupled to the processor 1501. The server 1500 may also include network access ports 1506 coupled to the processor 1501 for establishing network interface connections with a network 1507, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

The processors 1302, 1411, and 1501 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1304, 1310, 1412, 1413, 1502, and 1503 before they are accessed and loaded into the processors 1302, 1411, and 1501. The processors 1302, 1411, and 1501 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1302, 1411, and 1501 including internal memory or removable memory plugged into the device and memory within the processor 1302, 1411, and 1501 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A first computing device, comprising:
a first network transceiver; and
a processor coupled to the first network transceiver and configured with processor-executable instructions to perform operations comprising:
   receiving a prediction request message from a second computing device comprising a second network transceiver;
   predicting a user behavior of a user associated with the computing device in response to the prediction request message;
   modifying the predicted user behavior based on received feedback on a previously run predictive search;
   generating a user behavior based search modifier based at least in part on the modified predicted user behavior, wherein the user behavior based search modifier is a message which includes information comprising one or more additional search terms with which to modify user-entered search terms before a search is conducted; and
   sending the user behavior based search modifier to the second computing device via the second network transceiver.

2. The first computing device of claim 1, wherein the processor is configured with processor-executable instructions to perform operations such that predicting a user behavior associated in response to the prediction request message further comprises predicting a user behavior at a predicted time when the search will be relevant received within the prediction request message.

3. The first computing device of claim 1, wherein the processor is configured with processor-executable instructions to perform operations further comprising:
   determining a current location of the first computing device; and
   sending the current location of the first computing device to the second computing device.

4. The first computing device of claim 1, wherein the processor is configured with processor-executable instructions to perform operations further comprising determining a historical behavior associated with the user, wherein the processor is configured with processor-executable instructions to perform operations such that generating a user behavior based search modifier based at least in part on the predicted user behavior comprises generating a user behavior based search modifier based at least in part on the historical behavior associated with the user and the predicted user behavior.

5. The first computing device of claim 1, wherein the processor is configured with processor-executable instructions to perform operations further comprising determining a recent behavior associated with the user, and
   wherein the processor is configured with processor-executable instructions to perform operations such that generating a user behavior based search modifier based at least in part on the predicted user behavior comprises generating a user behavior based search modifier based at least in part on the recent behavior associated with the user and the predicted user behavior.

6. The first computing device of claim 5, wherein the processor is configured with processor-executable instructions to perform operations such that the recent user behavior associated with the user consists of previous searches, previous messages, user calendar entries, device settings, user on-line activity, and/or recent user movements.

7. A first computing device, comprising:
   means for receiving a prediction request message from a second computing device;
   means for predicting a user behavior of a user associated with the first computing device in response to the prediction request message;
   means for modifying the predicted user behavior based on received feedback on a previously run predictive search;
   means for generating a user behavior based search modifier based at least in part on the modified predicted user behavior, wherein the user behavior based search modifier is a message which includes information comprising one or more additional search terms with which to modify user-entered search terms before a search is conducted; and
   means for sending the user behavior based search modifier to the second computing device.

8. The first computing device of claim 7, wherein means for predicting a user behavior associated in response to the prediction request message further comprises means for predicting a user behavior at a predicted time when the search will be relevant received within the prediction request message.

9. The first computing device of claim 7, further comprising:
   means for determining a current location of the first computing device; and
   means for sending the current location of the first computing device to the second computing device.

10. The first computing device of claim 7, further comprising means for determining a historical behavior associated with the user, wherein means for generating a user behavior based search modifier based at least in part on the predicted user behavior comprises means for generating a user behavior based search modifier based at least in part on the historical behavior associated with the user and the predicted user behavior.

11. The first computing device of claim 7, further comprising means for determining a recent behavior associated with the user,
   wherein means for generating a user behavior based search modifier based at least in part on the predicted user behavior comprises means for generating a user behavior based search modifier based at least in part on the recent behavior associated with the user and the predicted user behavior.

12. The first computing device of claim 11, wherein the recent user behavior associated with the user consists of previous searches, previous messages, user calendar entries, device settings, user on-line activity, and/or recent user movements.

13. A non-transitory processor-readable storage medium having stored thereon processor-executable instructions configured to cause a processor of a first computing device to perform operations comprising:

receiving a prediction request message from a second computing device;

predicting a user behavior of a user associated with the first computing device in response to the prediction request message;

modifying the predicted user behavior based on received feedback on a previously run predictive search;

generating a user behavior based search modifier based at least in part on the modified predicted user behavior, wherein the user behavior based search modifier is a message which includes information comprising one or more additional search terms with which to modify user-entered search terms before a search is conducted; and sending the user behavior based search modifier to the second computing device.

14. The non-transitory processor-readable storage medium of claim 13, wherein the stored processor-executable instructions are configured to cause a processor of the first computing device to perform operations such that predicting a user behavior associated in response to the prediction request message further comprises predicting a user behavior at a predicted time when the search will be relevant received within the prediction request message.

15. The non-transitory processor-readable storage medium of claim 13, wherein the stored processor-executable instructions are configured to cause a processor of the first computing device to perform operations further comprising:

determining the computing device's current location; and sending the computing device's current location to the second computing device.

16. The non-transitory processor-readable storage medium of claim 13, wherein the stored processor-executable instructions are configured to cause a processor of the first computing device to perform operations further comprising determining a historical behavior associated with the user, and wherein the processor is configured with processor-executable instructions to perform operations such that generating a user behavior based search modifier based at least in part on the predicted user behavior comprises generating a user behavior based search modifier based at least in part on the historical behavior associated with the user and the predicted user behavior.

17. The non-transitory processor-readable storage medium of claim 13, wherein the stored processor-executable instructions are configured to cause a processor of the first computing device to perform operations further comprising determining a recent behavior associated with the user, and wherein the processor is configured with processor-executable instructions to perform operations such that generating a user behavior based search modifier based at least in part on the predicted user behavior comprises generating a user behavior based search modifier based at least in part on the recent behavior associated with the user and the predicted user behavior.

18. The non-transitory processor-readable storage medium of claim 13, wherein the stored processor-executable instructions are configured to cause a processor of the first computing device to perform operations such that the recent user behavior associated with the user consists of previous searches, previous messages, user calendar entries, device settings, user on-line activity, and/or recent user movements.

* * * * *